United States Patent

Sawada

[11] Patent Number: 5,151,906
[45] Date of Patent: Sep. 29, 1992

[54] SEMICONDUCTOR MEMORY DEVICE HAVING SELF-CORRECTING FUNCTION

[75] Inventor: Kikuzo Sawada, Koganei, Japan

[73] Assignee: Rohm Co., Ltd., Kyoto, Japan

[21] Appl. No.: 517,694

[22] Filed: May 2, 1990

[30] Foreign Application Priority Data

May 25, 1989 [JP] Japan .................................. 1-132177

[51] Int. Cl.⁵ ............................................ G06F 11/10
[52] U.S. Cl. ................................. 371/51.1; 371/21.4; 371/21.1
[58] Field of Search ............... 371/51.1, 50.1, 49.1, 371/21.1, 21.4

[56] References Cited

U.S. PATENT DOCUMENTS

| | | | |
|---|---|---|---|
| 4,612,630 | 9/1986 | Rosier | 371/21.4 X |
| 4,779,272 | 10/1988 | Kohda et al. | 371/21.4 |
| 4,901,320 | 2/1990 | Sawada et al. | 371/51.1 |
| 4,967,415 | 10/1990 | Tanagawa | 371/51.1 |

Primary Examiner—Jerry Smith
Assistant Examiner—Allen M. Lo
Attorney, Agent, or Firm—Fay, Sharpe, Beall, Fagan, Minnich & McKee

[57] ABSTRACT

A semiconductor memory device having a self-correcting function comprises memory cells for storing data and memory cells for storing parity bit data. The criterion of detecting in the first read circuit is set smaller and the criterion of detecting in the second read circuit is set greater in value than the current value read in such a state that the electric charge in the memory cell becomes depleted. In this way, the first read circuit detects a current value smaller and the second read circuit detects a current value greater than the value of the current flowing through the memory cell holding the bit error because of charge depletion. Consequently, even if the variation of the threshold resulting from the charge depletion allows the presence of a faulty memory cell, one of the read circuits can make a correct data read.

33 Claims, 3 Drawing Sheets

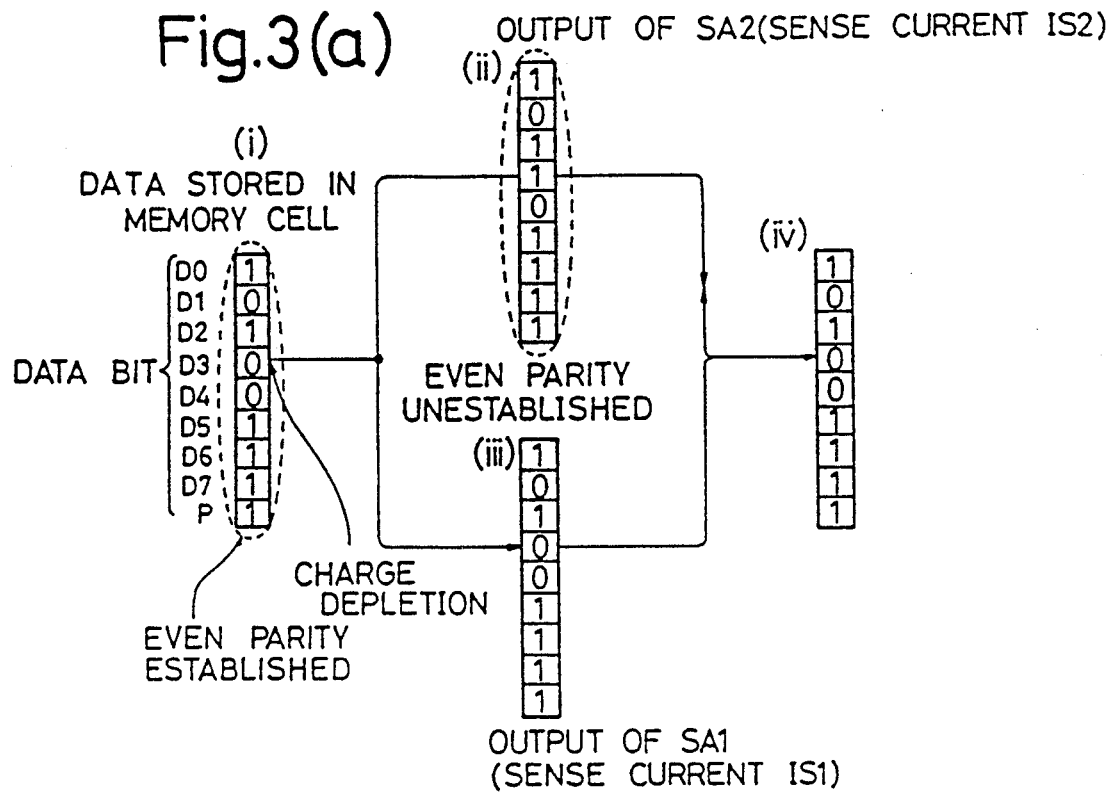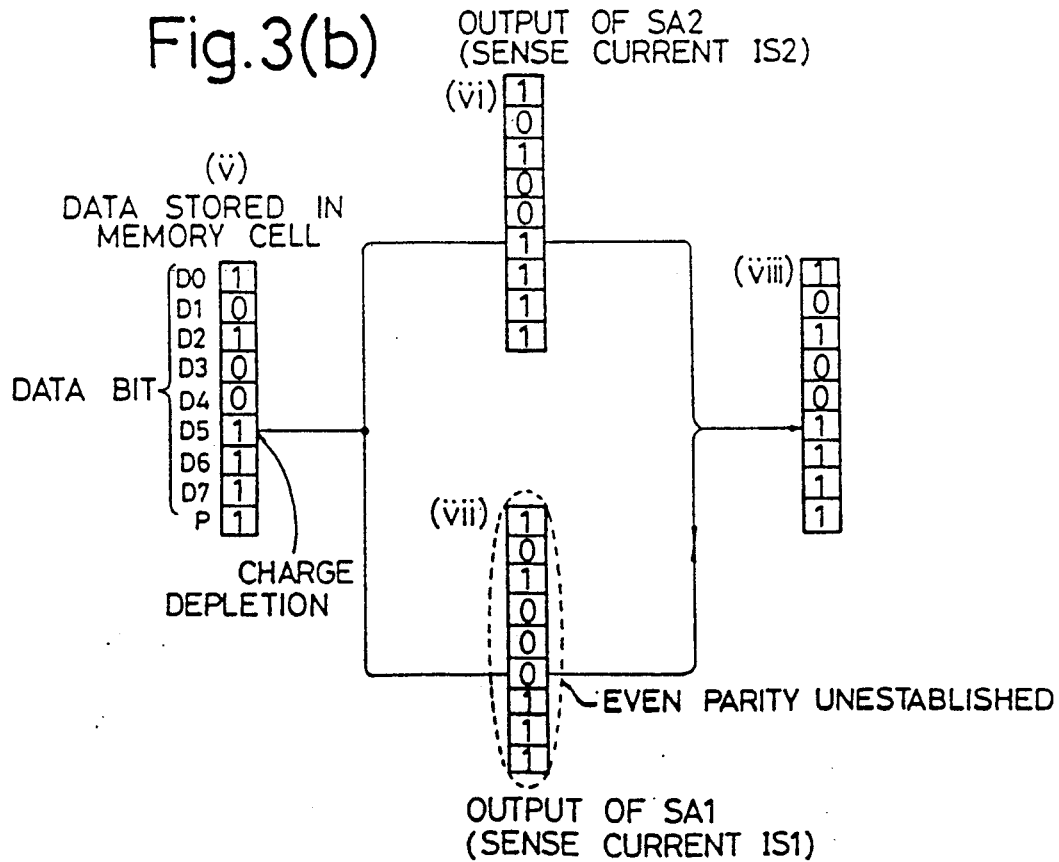

SEMICONDUCTOR MEMORY DEVICE HAVING SELF-CORRECTING FUNCTION

BACKGROUND OF THE INVENTION

1. Technical Field

The present invention relates to semiconductor memory devices having self-correcting functions and more particularly to a semiconductor memory device having a self-correcting function for correcting errors without using an error-correcting circuit in an EEPROM which employs a MOS floating-gate having a tunnel oxide film on the drain as a memory cell.

2. Prior Art

The probability that faulty bits occur increases in the case of a ROM having a capacity of over 1M bits and this results in decreasing product yield. For this reason, redundant memory cells have heretofore been provided to improve the product yield and simultaneously to remedy faulty memory cells or the whole faulty memory. A memory cell for storing a parity bit, a parity check circuit, a built-in ECC circuit and the like are otherwise provided to detect errors in bits, so that faulty bits are partially remedied.

However, the use of such redundant memory cells makes it troublesome to remedy the faulty bits by means of internal wiring. The drawback in this case is that chip dimensions are likely to become doubled in the system of making a spare memory cell 100% redundant.

In the remedial method using the ECC circuitry, on the other hand, a memory cell for storing parity data is required and if the cell is made to have an error-correcting function in particular, it is insufficient to add a 1-bit parity bit to each data. With 4-bit parity relative to 8-bit data, for instance, the whole cell volume will increase by 1.5 times greater, compared with normal data storage. However, this arrangement is disadvantageous in that the chip area also tends to increase.

SUMMARY OF THE INVENTION

An object of the present invention is to provide a semiconductor memory device having a self-correcting function for making it possible to make a 1-bit correction without using an ECC circuit.

Another object of the present invention is to provide a semiconductor memory device having a self-correcting function for making it possible to output correct data even when a 1-bit error occurs because of charge depletion.

Still another object of the present invention is to provide a semiconductor memory device having a self-correcting function for making it possible to make a 1-bit correction without substantially increasing chip area.

In order to accomplish the foregoing objects, the semiconductor memory device having a self-correcting function according to the present invention comprises a plurality of nonvolatile memory cells, a first and a second read circuit for reading a plurality of bit data from the plurality of memory cells, wherein one part of the group of memory cells comprises memory cells for storing data, whereas the other part of the group thereof comprises memory cells for storing parity bit data on data being stored, and wherein each memory cell selectively stores bit data of "0" or "1" by causing itself to be charged with an electric charge, either electrons or holes, whereas the first and the second read circuit receive a plurality of bit data out of the bit data stored in the plurality of memory cells from the plurality of the same selected memory cells in order to output correct data with correct parity out of the plurality of bit data. Moreover, the criterion of detecting the bit data of "0" and "1" in the first read circuit is set smaller in value than the current value read in such a state that the electric charge charged in the memory cell stored with data of either "0" or "1" becomes depleted. On the other hand, the criterion of detecting the bit data of "0" and "1" in the second read circuit is set greater in value than the current value read in such a state that the electric charge charged in the memory cell stored with the other data of either "1" or "0" becomes depleted.

As the memory cell for storing bit data of either "0" or "1" by charging itself with either electron or hole charge, there is a known EEPROM comprising MOS floating-gate memory cells, each having a tunnel oxide film on the drain. However, the EEPROM has the disadvantage of revoking reloadability as the characteristics deteriorate if programming/erasure is frequently repeated.

Such performance is generally expressed by the number of reloadable times. Given the threshold voltage $V_{tc}(V)$ of a standard memory cell being charged and discharged as a function of the number of reloadable cycles, resultant values conform to those plotted in FIG. 2(a), which will be explained later, and the possible number of reloadable times becomes approximately $10^4$–$10^6$. In FIG. 2(a), $TH_o$ refers to a threshold when no electric charge exists on the floating gate; $TH_h$ refers to thresholds when data is erased from the memory cell after electrons are injected into the floating gate; and $TH_L$ refers to thresholds when data is written to the memory cell after an electric charge (holes) is injected into the floating gate (or after electrons escape from the floating gate).

The reasons for the generation of defective bits (or faulty bits) during the production of EEPROMs, ROMs or the like include disconnection of wiring in a memory cell, unsatisfactory formation of an area where elements are formed and the like. With the recent improvement of manufacturing technique, however, what causes faults other than those enumerated above is often considered attributable to a memory cell whose floating gate is not sufficiently charged with nor caused to discharge an electric charge (or electrons). Charge depletion occurs likewise in the case of the aforementioned reloadable cycle and often most of the bit cells become often faulty as the gate threshold voltage is not set at the intended value. Consequently, it is possible to remedy almost all faults in memories, provided any memory cell in which no normal threshold voltage cannot be set is subjected to error correction.

Simultaneously with the recent improvement of manufacturing technique, the provision of the self-correcting function by furnishing a number of redundant and parity cells has heretofore caused production cost per chip area to increase. As set forth above, the first and the second read circuit for reading the data stored in the memory cells by applying sense voltage thereto are provided for the first read circuit to detect a current value smaller than what flows through a memory cell causing a bit error because of charge depletion and for the second read circuit to detect a current value greater than what flows through a memory cell causing a bit error because of charge depletion. Even if the variation of the threshold resulting from the charge depletion allows the presence of a faulty memory cell therein, one of the read circuits can make correct data read. Since whether or not the data is correct is made identifiable by adding a 1-bit parity thereto for storage, the capacity of the memory is hardly necessarily increased.

Therefore, a memory having a small area occupied by a chip can be materialized without the necessity of a large-capacity parity cell, an ECC circuit and the like.

BRIEF DESCRIPTION OF THE DRAWINGS

FIGS. 3(a) and 3(b) are diagrams explanatory of the correcting principle.

DESCRIPTION OF THE PREFERRED EMBODIMENT

Figure 1:
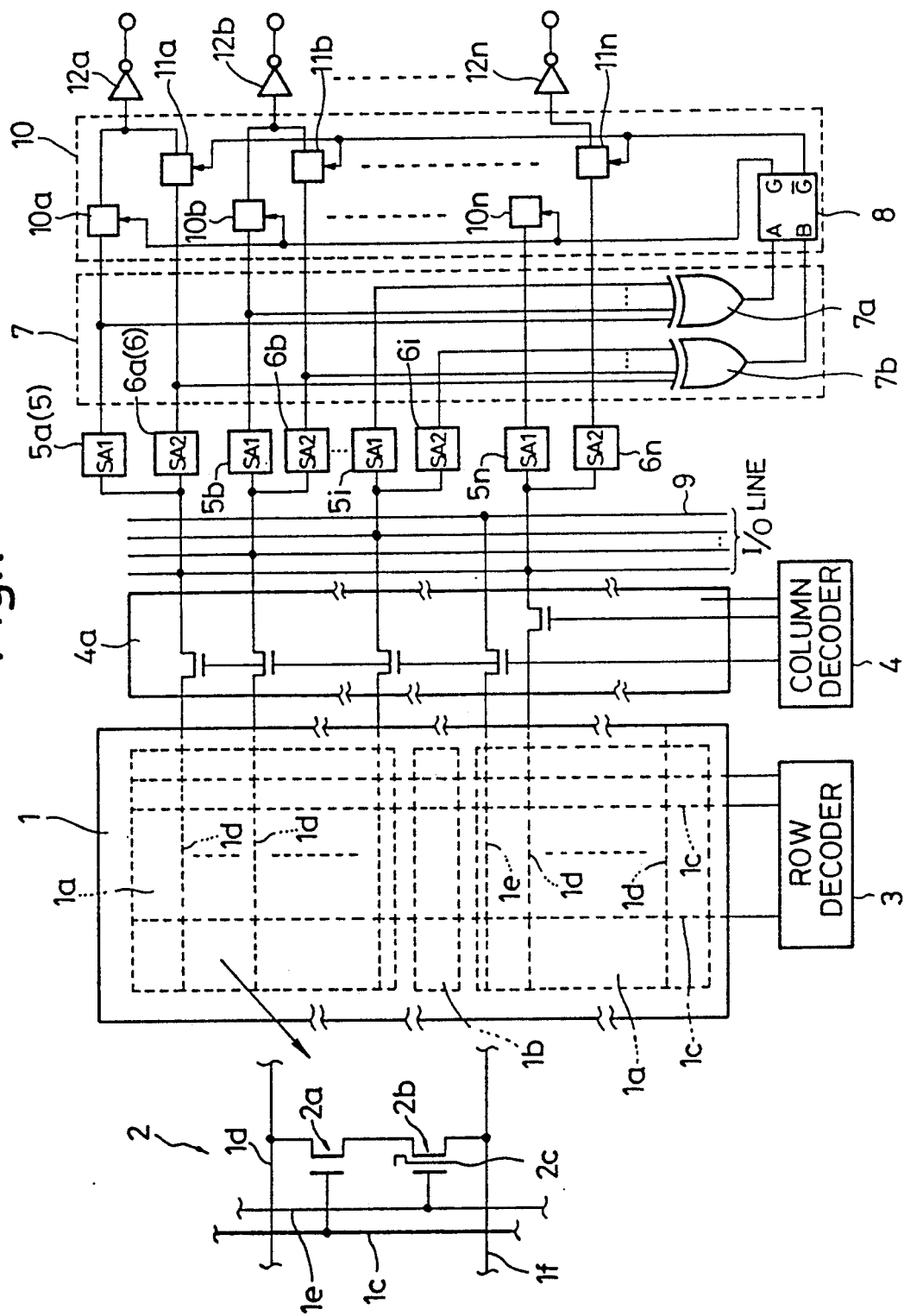
FIG. 1 is a block diagram of an EEPROM with the application of a semiconductor memory device having a self-correcting function.

In FIG. 1, numerals 1 and 2 denote a memory cell array and a configuration of each of the memory cells constituting the memory cell array, respectively. The memory cell array 1 is, as shown by the memory cell 2 that is a MOS floating gate type, an arrangement of memory cells, each locally having a tunnel oxide film $2c$ on the drain, a selection transistor $2a$ and its storage transistor $2b$.

The memory cell array 1 is provided with a parity memory cell $1b$, word lines $1c$, bit lines $1d$, a sense line $1e$, a cell ground line $1f$ and the like in addition to data memory cells $1a, 1a, \ldots$. The word lines $1c$ are connected to a row decoder 3 and the bit lines $1d$ are connected to respective switches $4a$ which are switched by a column decoder 4. The word lines $1c$ are further connected via the switches to the first and second corresponding sense amplifiers $5a, 6a, 5b, 6b, \ldots 5i, 6i, \ldots, 5n, 6n$ in pairs, respectively. Moreover, the sense line $1e$ is connected via the predetermined switch out of the group of switches $4a$ to a sense voltage line 9.

In this case, the first sense amplifiers (SA1) $5a, 5b, \ldots, 5i, \ldots, 5n$ and the second sense amplifiers (SA2) $6a, 6b, \ldots, 6i, \ldots, 6n$ are different in detected current value. As will be described later, the first sense amplifier 5 (as what represents $5a, 5b, \ldots, 5n$) has a first current threshold different from a predetermined threshold at the level normally detected in an EEPROM and detects a current value smaller than the value of a current flowing through a memory cell holding a bit error ("1") due to charge depletion after the erasure state (storage value "0"). The second sense amplifier 6 (as what represents $6a, 6b, \ldots, 6n$) has the first current threshold different from the predetermined threshold at the level normally detected therein likewise and detects a current value greater than the value of the current flowing through the memory cell holding a bit error ("0") due to charge depletion after the write state. One of the first and second sense amplifiers 5, 6 receives 1-bit parity data from the parity memory cell $1b$.

Numeral 7 denotes a parity check circuit comprising an EXOR circuit $7a$ for receiving the output of each sense amplifier 5 to obtain the EXOR of the output and another EXOR circuit $7b$ for receiving the output of each sense amplifier 6 to obtain the EXOR of the output. The outputs of the EXOR circuits $7a, 7b$ are fed to an output switch circuit 8.

Numeral 10 denotes an output selection circuit comprising a group of gate circuits corresponding to the first and the second sense amplifier 5, 6, the group of gate circuits comprising gate circuits $10a, 11a, 10b, 11b, \ldots 10n, 11n$. According to gate signals (G, $\overline{G}$) from the output switch circuit 8, the output selection circuit 10 selects either output on the side of the gate circuit 10, (as what represents $10a, 10b, \ldots, 10n$) corresponding to the first sense amplifier 5 or output on the side of the gate circuit 11 (as what represents $11a, 11b, \ldots, 11n$) corresponding to the second sense amplifier 6 so as to make one of the outputs of the first and the second sense amplifier 5, 6 pass therethrough as an effective one and to send out the output to buffers $12a, 12b, \ldots, 12n$ corresponding to the respective outputs.

A detailed description will subsequently be given of the operation of the EEPROM with reference to FIGS. 2 and 3.

Figure 2A:
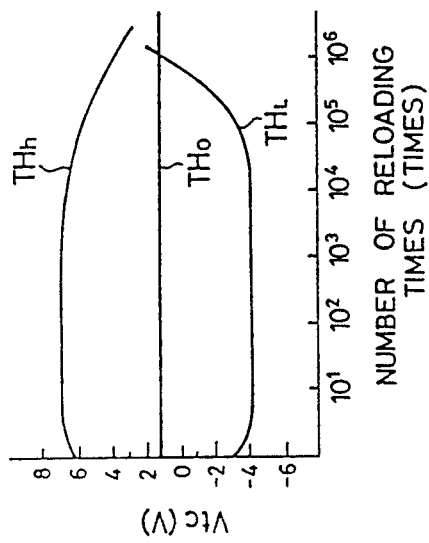
FIGS. 2(a) and 2(b) are graphs explanatory of operating threshold-number of write-time characteristics and memory cell current-sense amplifier current characteristics of the EEPROM, respectively.

FIG. 2(a) shows the relation between the number of reloading times and the thresholds in the floating-gate EEPROM having a tunnel oxide film on the drain. There are shown variations THh, THo, THL of the erasure/write threshold voltage with respect to the number of reloading times shown on the abscissa axis. As the number of reloading times exceeds $10^5$, the difference among the thresholds diminishes and the characteristics deteriorate. As stated above, THo denotes a threshold while the floating gate remains uncharged and is normally valued at approximately 1 V. THh denotes thresholds when electrons are injected into the floating gate to place the memory cell in the erasure state and is normally valued at approximately 7 V. THL denotes thresholds when an electric charge (holes) is injected into the floating gate (or when electrons escape from the floating gate) to have data written to the memory cell and is normally valued at approximately $-4$ V.

In this case, the deterioration of the characteristics at reloading times exceeding $10^5$ results from charge (holes or electrons) depletion (charge depletion) with which the floating gate is charged; the same thing is said to occur in the memory cell holding a faulty bit.

Figure 2B:
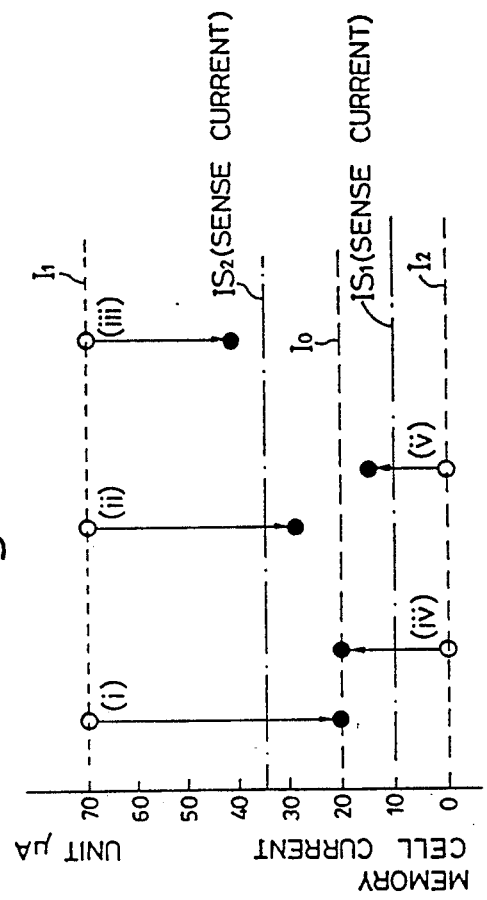

FIG. 2(b) shows the relation between the values of the current flowing through the memory cell with and without charge depletion and those of the detected current flowing through the sense amplifier. The values [$\mu$A] of the current flowing through the memory cell are indicated on the ordinate axis.

In this case, Io denotes the value of the current flowing through the memory cell 2 when the electric charge charged in the floating gate has completely been depleted; I1 the current value of the memory cell when the positive electric charges are accumulated; and I2, the current value thereof likewise when the negative electric charges are accumulated. In addition, IS1 denotes the current value of the first sense amplifier 5 as a detecting criterion, which corresponds to the aforementioned first current threshold; IS2 the current value of the second sense amplifier 6 as a detecting criterion, which corresponds to the aforementioned second current threshold. This example refers to a case, for instance, where the voltage applied to the sense line $1d$ (sense voltage line 9) is set constant (e.g., at 2 V).

The following relationship requires being established between the reference current values IS1, IS2 of the respective sense amplifiers and the current value Io of the memory cell which undergoes the charge depletion:

IS2>Io>IS1

With this relationship thus established, the second sense amplifier 6 is able to detect the read data "1" and output "0" when the memory cell current exceeds IS2. When the memory cell current is less than IS2, the second sense amplifier 6 is able to detect the read date "0" and output "1." Since the output of the sense amplifier reverses, depending on the current value, it normally indicates "0" in the data write state and "1" in the erasure state contrary to the contents of the data. When the memory cell current is over IS1, the first sense amplifier 5 detects the read data "1" and outputs "0" and when it is below IS1, it is able to detect the read data "0" and output "1."

What has been stated above refers to the memory cell 2 corresponding to the charge-depletion-free state (i.e., the characteristics up to approximately $10^5$ in the graph of FIG. 2(a)) and it also refers to a case where "0" (the write state) or "1" (the erasure state) is detected according to the amount of the current flowing through each sense amplifier in compliance with the first and the second current threshold by adding the predetermined sense voltage (e.g., approximately 2 V) to the sense line 1e. However, the memory cell in which the faulty bit occurs is different in that there is charge depletion. In other words, as shown by 0→ of FIG. 2(b) (i)-(iii), the floating gate of the memory cell that has stored the "0" bit data undergoes the charge depletion and causes the positive electric charge (holes) in the write state to be discharged, thus making the value of the current flowing through the memory cell shift to the current value Io side. In the case of the memory cell that has stored the "1" bit data, on the contrary, the floating gate undergoes the charge depletion as shown by 0→● of (iv), (v) and causes the negative electric charge (electrons) in the write state to be discharged, thus making the current value shift to the current value side Io likewise.

Even though the memory cell 2 is in such a charge depletion state as mentioned above, however, it is possible to read correct data by means of either first or second sense amplifier 5, 6.

More specifically, each current value in the charge depletion state is located above the detected reference current value (first current threshold) IS1 of the first sense amplifier 5 while the states (i)-(iii) exist, whereby the first current threshold IS1 allows correct data to be read, despite the charge depletion. While the states shown by (iv), (v) exist, each current value in the charge depletion state is located under the detected reference current value (second current threshold) IS2 of the second sense amplifier 6, whereby the second current threshold IS2 allows correct data to be read, despite the charge depletion.

Although a description has been given of the charge depletion in the states (i)-(iii) with the memory cell having "0" recorded thereon and the states (iv)-(v) with the memory cell having "1" recorded thereon, the relation between the "0" and "1" data is reversed if an inversion amplifier is provided between the sense amplifier and the memory cell. Therefore, the storage states of "0", "1" as viewed from the sense amplifier are relative and with an inversion amplifier the states of (i)-(iii) are considered those in which the memory cell has "1" recorded, whereas those of (iv)-(v) are considered the states in which it has "0" recorded.

FIG. 3 is a diagram illustrating operations in the charge depletion state, wherein as shown by (i) of FIG. 3(a), correct data bits of one word (having 8 bits with digits of $D_o$, $D_1$, $D_2$, $D_3$, $D_4$, $D_5$, $D_6$, $D_7$) are assumed "10100111", for instance, a parity bit (P) as even parity in this case being assumed "1." Although the even parity has been established in the correct data bits, the D3 bit changes from "0" to "1" and is read as a wrong data with respect to (i), (ii) of FIG. 2(b) when the data (i) of "10100111" is read by the second sense amplifier 6. The result becomes "10110111" as shown by (ii) of FIG. 3(a). At this time, the parity bit remains to be "1" and no parity is established in the EXOR circuit 7b of the parity check circuit 7. When the data "10100111" of (i) in the charge depletion state is read by the first amplifier 5, on the other hand, the bit "0" of D3 remains to be "0" and as shown by (iii) of FIG. 3(a), the read data becomes "10100111", so that correct data is obtained. The parity bit at this time remains to be "1" and parity is established in the EXOR circuit 7a of the parity check circuit 7. If the correct data with the parity established is selected in conformity with the output of the EXOR circuit 7a, the error is corrected and correct data (iv) of FIG. 3(a) is obtained.

In this way, the data from the first and the second sense amplifier 5, 6 are subjected to parity check in the parity check circuit 7. The outputs (of the EXOR circuits 7a, 7b) thus detected are provided to the respective terminals A, B of the output switch circuit 8 and gate signals corresponding to the parity are produced from the respective terminals G, $\overline{G}$ of the output switch circuit 8. The gate signals corresponding to established parity are then sent to the respective gate circuits of the output selection circuit 10 and respectively set as data selection signals therefor (the gate signals where no parity has been established are simultaneously sent to the other gate circuits and set as non-selection signals). The gate circuits (the pair of 10a, 10b, . . . , 10n or 11a, or 11b, . . . , 11n) of the output selection circuit 10 allow correct data to pass therethrough, whereby the correct data can be transferred to the buffer 12 (as what represents 12a, 12b, . . . 12n).

Contrary to the case of FIG. 3(a), FIG. 3(b) refers to a case (iv) or (v) of FIG. 2(b) where "1" of D5 is replaced with "0" as the storage data whose data bit is "1" undergoes charge depletion. When the data "10100111" of FIG. 3(b) (v) is read by the second sense amplifier 6, the bit "1" of D5 is shown as "1" at (vi). Correct data of "10100111" is read, whereby parity has also been established then. When the data "10100111" of (v) is read by the first sense amplifier 5, on the other hand, the bit "1" of D5 changes to "0" and as shown by (vii), wrong data of "10100011" is obtained. No parity remains established then for sense amplifier 5. In this case, correct data of (vi) is selected by the output selection circuit 10 and transferred to the buffer 12 as a data bit (viii).

The cases stated above refers to the one where the bit "0" becomes "1" because of the charge depletion and the other where the bit "1" becomes "0" because of the charge depletion, with respect to certain storage data. Apart from these cases, parity is established when two bits in the storage data undergo charge depletion, respectively. However, such a case is quite seldom and therefore negligible because no problem is posed in many cases, provided a 1-bit error is correctable. Apart from this case, the output selection circuit 8 needless to say selects the output of what has established the parity first whenever both the first and the second sense amplifier 5, 6 read correct data.

As set forth above, the EEPROM has been referred to as an example in this embodiment. Notwithstanding, the present invention is applicable to any one of memories and not limited to EEPROMs on condition that the memory is equipped with the first and the second sense amplifier and capable of causing the current values detected by these sense amplifiers to have the following relation:

$$IS2 > Io > IS1$$

where IS1=current value as a detecting criterion of the first sense amplifier; IS2=current value as a detecting criterion of the second amplifier; and Io=current value at which an electric charge has been depleted completely in the memory cell for storing data of "1" or "0" in the form a positive or negative electric charge.

Although errors are corrected without using the ECC circuit in the embodiment, the present invention does not preclude the possibility of employing such an ECC circuit in addition to the use of the sense amplifiers as shown in the embodiment of the present invention for correcting errors to a degree in order to remedy defective memory cells other than those suffering from charge depletion.

Although the parity check circuit and the output selection circuit are provided in the semiconductor device in the embodiment, these circuits may be incorporated in a control circuit such as a CPU or the like without providing them as part of the memory, or may be incorporated in a circuit that combines the memory and the control circuit like a one-chip microcomputer or the like. When these circuits are incorporated in the CPU, parity check and correct data selection can be conducted through processing programs.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A semiconductor memory device having a self-correcting function, comprising:
    a plurality of nonvolatile memory cells;
    first and second read circuits for reading a plurality of bits from the plurality of memory cells;
    one part of the memory cells comprises memory cells for storing data bits, another part thereof being memory cells for storing parity bits on data bits stored, wherein each memory cell selectively stores bits of "0" or "1" by an electric charge;
    the first read circuit having a criterion of detecting the bits of "0" and "1" set smaller in value than a current value read in such a state that the electric charge charged in the memory cell stored with data of one of either "0" or "1" becomes depleted;
    the second read circuit having a criterion of detecting the bits of "0" and "1" set greater in value than a current value read in such a state that the electric charge charged in the memory cell stored with data of the other of either "1" or "0" becomes depleted; and
    the first and the second read circuits being connected to respectively receive the same bits from the plurality of the same selected memory cells and having means to output correct data with correct parity out of the plurality of bits.

2. A semiconductor memory device having a self-correcting function, comprising:
    a plurality of nonvolatile memory cells, each for selectively storing a bit of "0" or "1" with an electric charge, either electrons or holes, one part of the memory cells storing data bits, another part of the memory cells storing parity bits on data bits being stored;
    first and second read circuits for reading a plurality of the same data and parity bits out of selected memory cells;
    the first read circuit having criterion of detecting the bit data of "0" and "1" set smaller in value than a current value read in such a state that the electric charge charged in the memory cell stored with that of either "0" or "1" becomes depleted;
    the second read circuit having criterion of detecting the bit data of "0" and "1" set greater in vale than a current value read in such a state that the electric charge charged in the memory cells stored with the other of either "1" or "1"; and
    means subjecting the plurality of bit data read by the first read circuit and the plurality of bit data read by the second read circuit respectively to parity checking, and, based upon the parity checking, outputting the plurality of bit data deemed correct as a result of the parity checking.

3. A semiconductor memory device having a self-correcting function as claimed in claim 2, including a parity check circuit for receiving the respective pluralities of bits obtained from the first and the second read circuit and subjecting the bits to the parity check so as to output the one plurality of bit data deemed correct in accordance with the results of the check conducted by the parity check circuit.

4. A semiconductor memory device having a self-correcting function as claimed in claim 3, including an output selection circuit for receiving the respective pluralities of bit data obtained from the first and the second read circuit and subjecting the bit data to the parity check so as to select and output the one plurality of bit data deemed correct in accordance with the results of the check conducted by the parity check circuit.

5. A semiconductor memory device having a self-correcting function, comprising:
    a plurality of nonvolatile memory cells having transistors each for selectively storing bit data of "0" or "1" by causing its electrode to be selectively charged with an electric charge, either electrons or holes, word lines connected to the memory cells and used for selecting at least one of the plurality of memory cells, bit lines respectively connected to the memory cells and used for transmitting and receiving data to and from the memory cell selected from among the plurality of memory cells, a sense line connected to the gate electrode of at least one memory cell selected by the word line, and a memory array for storing parity bit data in part of the memory cells;
    first and second read circuits for reading the bit data stored in the memory cell selected according to a signal on the word line, together with the parity bit data, as read data by applying a sense voltage to the sense line;
    a parity check circuit for subjecting the read data obtained from the first read circuit and the read data obtained from the second read circuit to parity check, respectively;

a selection circuit for selecting the read data of either the first or second read circuits as an output deemed correct in accordance with the results of the check conducted by the parity check circuit;

the first read circuit having a value smaller than a current value of the memory cell obtained by applying the sense voltage in such a state that the electric charge charged in the gate electrode stored with bit data of either "0" or "1" becomes depleted as the criterion of detecting the bit data of "0" and "1"; and the second read circuit having a value greater than a current value of the memory cell obtained by applying the sense voltage in such a state that the electric charge charged in the gate electrode stored with the other data of either "0" or "1" becomes depleted as the criterion of detecting the bit data of "0" and "1".

6. A semiconductor memory device having a self-correcting function as claimed in claim 5, wherein the transistor is a MOS transistor, wherein the gate electrode is a floating gate formed via a tunnel oxide film locally provided on the drain of the MOS transistor, wherein the memory array is an EEPROM comprising memory cells for storing data and memory cells for storing parity bits, wherein the first and the second read circuit are sense amplifiers connected to the bit lines, and wherein the selection circuit is a gate circuit for making effective the output of the one read circuit in which parity has been established out of the first and the second read circuit on receiving the results of the check from the parity check circuit.

7. An error correction circuit for correcting received data bits on the basis of at least one parity bit received with the data bits, comprising:

a plurality, corresponding in number to the data bits, of pairs of first and second sense amplifiers each having inputs commonly connected to receive a respective data bit and having separate outputs;

said first sense amplifiers having a threshold value higher than the value of a depleted bit;

said second sense amplifiers having a threshold value lower than the value of a depleted bit; and means checking the parity of said data and parity bits for switching the output of the circuit between the outputs of said first and second sense amplifiers.

8. The circuit of claim 7, wherein said means comprises a parity checking circuit for the outputs of said first sense amplifiers and a second parity checking circuit for the outputs of said second sense amplifiers to respectively provide two parity check outputs.

9. The circuit of claim 8, wherein said means further includes a first switch between the output of each first sense amplifier and the circuit output, and a second switch between the output of each second amplifier and the circuit output.

10. The circuit of claim 9, wherein said means further includes a flip-flop having first and second inputs respectively connected to receive the outputs of said parity checking circuits, and further having one output connected to all of said first switches and a complementary output connected to all of said second switches.

11. The circuit of claim 9, wherein each of said switches is directly connected between the output of its respective sense amplifier and the circuit output.

12. The circuit of claim 11, wherein each of said switches is a gate device.

13. The circuit of claim 8, wherein each of said parity checking circuits is an exclusive OR gate directly connected to the outputs of corresponding sense amplifiers.

14. The circuit of claim 8, integrally formed as a part of a single semiconductor memory device further comprising an array of a plurality of data memory cells and parity memory cells.

15. The circuit of claim 14, wherein said means further includes a first switch between the output of each first sense amplifier and the circuit output, and a second switch between the output of each second amplifier and the circuit output.

16. The circuit of claim 15, wherein each of said memory cells is a nonvolatile memory cell.

17. The circuit of claim 14, wherein each of said memory cells is a nonvolatile memory cell.

18. The circuit of claim 7, integrally formed as a part of a single semiconductor memory device further comprising an array of a plurality of data memory cells and parity memory cells.

19. The circuit of claim 18, wherein each of said memory cells is a nonvolatile memory cell.

20. The device of claim 19, wherein each of said memory cells comprises a select transistor and a floating gate storage transistor.

21. The circuit of claim 20, wherein each of said transistors is a MOS device.

22. The circuit of claim 7, constructed as an EEPROM.

23. The circuit of claim 7, wherein said means further includes a first switch between the output of each first sense amplifier and the circuit output, and a second switch between the output of each second amplifier and the circuit output.

24. The circuit of claim 23, wherein said means further includes a flip-flop having first and second inputs respectively connected to receive the outputs of said parity checking circuits, and further having one output connected to all of said first switches and a complementary output connected to all of said second switches.

25. An error correction circuit for correcting received data bits on the basis of at least one parity bit received with the data bits, comprising:

a plurality, corresponding in number to the data bits, of pairs of first and second sense means each having inputs commonly connected to receive a respective data bit and having separate outputs;

said first sense means having a reference sensing value higher than the value of a depleted bit;

said second sense means having a reference sensing value lower than the value of a depleted bit; and means checking the parity of said data and parity bits for switching the output of the circuit between the outputs of said first and second sense means.

26. The circuit of claim 25, wherein said means checking comprises a parity checking circuit for the outputs of said first sense means and a second parity checking circuit for the outputs of said second sense means to respectively provide two parity check outputs.

27. The circuit of claim 26, wherein said means checking further includes a first switch between the output of each first sense means and the circuit output, and a second switch between the output of each second sense means and the circuit output.

28. The circuit of claim 27, wherein said means checking further includes a flip-flop having first and second inputs respectively connected to receive the outputs of said parity checking circuits, and further having one output connected to all of said first switches and a complementary output connected to all of said second switches.

29. The circuit of claim 25, integrally formed as a part of a single semiconductor memory device further comprising an array of a plurality of data memory cells and parity memory cells.

30. The circuit of claim 29, wherein each of said memory cells is a nonvolatile memory cell.

31. The device of claim 30, wherein each of said memory cells comprises a select MOS transistor and a floating gate storage transistor.

32. The circuit of claim 31, wherein each of said switches is a gate device.

33. The circuit of claim 25, constructed as an EEPROM.

* * * * *